May 21, 1968   E. E. BATKE   3,384,391
TOWING BAR
Filed July 18, 1966   2 Sheets-Sheet 2
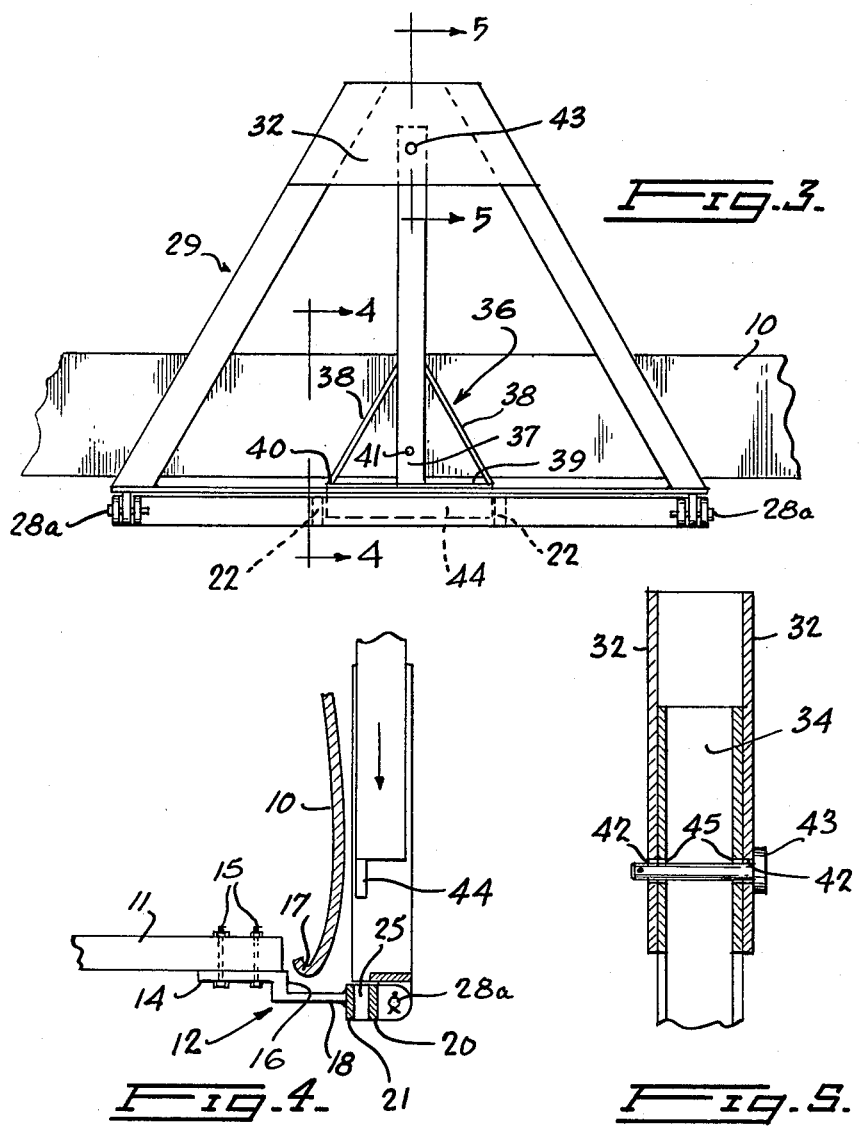
INVENTOR
EDWIN E. BATKE
By-
Fetherstonhaugh & Kent
His Attys United States Patent Office 3,384,391
Patented May 21, 1968

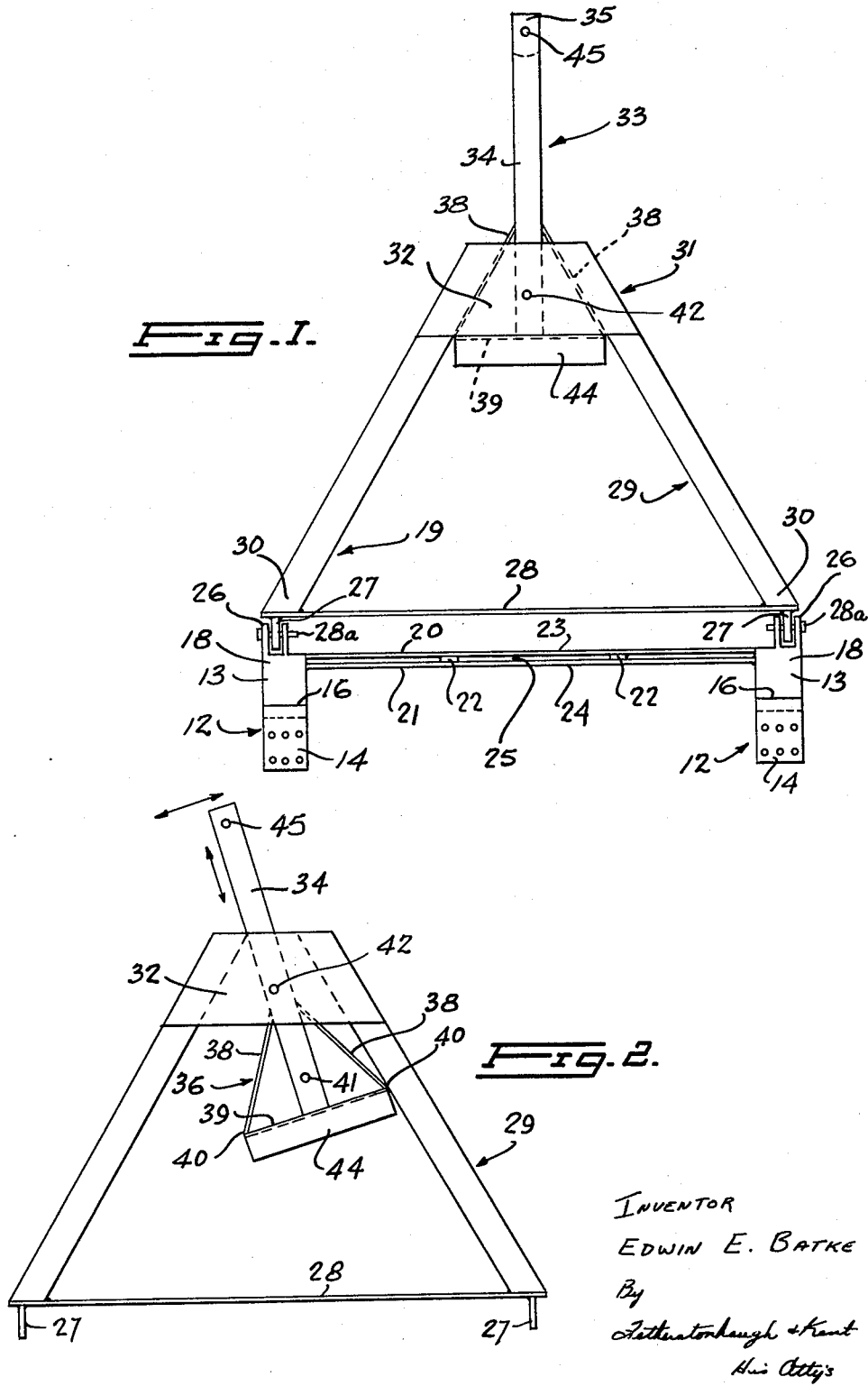

3,384,391
TOWING BAR
Edwin E. Batke, Netherhill, Saskatchewan, Canada, assignor to Beline Manufacturing Company Limited, Kindersley, Saskatchewan, Canada
Filed July 18, 1966, Ser. No. 565,851
6 Claims. (Cl. 280—478)

ABSTRACT OF THE DISCLOSURE

This is a towing bar for attachment to trucks or the like to enable same to be pulled by a tractor or any other towing device and comprises a pivoted A-frame having an extending and retractable towing member slidable therein and including means to lock the tow bar in the vertical position against the front grill without any danger of same becoming disengaged.

---

This invention relates to new and useful improvements in towing bars. It is often desirable and necessary for farmers, contractors and the like, when moving machinery and equipment from one location to another, to be able to transport a truck or other means of transportation unattended. It is normal that a towing bar be secured to the front of the truck or the like which may then be pulled by a tractor or any other towing device without the necessity of an operator being present.

In the past such towing bars have been home-made or custom-made to the operators' specifications. They comprise normally an A-type hitch attached to and pivoted on the front bumper or truck frame. When not in use, the hitch is either moved entirely or more often moved to an upright position and tied to the front of the truck by wire or such similar means.

This type of tow bar is unsafe inasmuch as the fastening means can readily become loose so that the towing bar swings downwardly when the truck is being driven with often serious results, and furthermore seriously obstructing the driver's vision.

The present invention overcomes these disadvantages by providing a pivotted A-frame with an extending and retractable towing member slidable therein and adapted to be pivoted by means of mounting structure to the chassis of the vehicle. Means are provided in association with the towing member to lock the tow bar in the vertical position against the front grill without any danger of same being disengaged and which furthermore is easily unlocked when the towing bar is required for use.

The principal object and essence of the invention is therefore to provide a device of the character herewithin described which can be stored in the vertical position with the towing member retracted or, alternatively, can be moved to the operating position with the towing member extended.

Another object of the invention is to provide a device of the character herewithin described in which the towing member includes an engaging means on the inner end thereof which engages with a socket on the mounting structure when the A-frame and towing member are in the retracted and vertical position.

Another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a plan view of the device with the connecting member extended.

FIGURE 2 is a plan view of the device showing the sideways movement of the connecting member prior to same being fully extended.

FIGURE 3 is a front elevation of the device in the storing position.

FIGURE 4 is a fragmentary view substantially along the line 4—4 of FIGURE 3.

FIGURE 5 is a fragmentary view substantially along the line 5—5 of FIGURE 3.

In the drawings like characters of reference indicate corresponding parts in the different figures.

Proceeding therefore to describe the invention in detail, reference should first be made to FIGURE 3 in which 10 illustrates the front bumper of a vehicle. FIGURE 4 shows this bumper in side elevation in connection with one of the longitudinal members 11 of the chassis of the vehicle.

Mounting structure collectively designated 12 comprises a pair of brackets 13 having an attachment portion 14 which may be secured to the aforementioned longitudinal frame member 11 by means of bolts 15, the remainder of the bracket extending forwardly of the vehicle.

This bracket is stepped downwardly as at 16 to clear the base 17 of the bumper and then extends forwardly as at 18 to provide pivotal attachment to the towing bar collectively designated 19. A transverse member 20 extends between the two brackets 13 and a further transverse member 21 also extends between the brackets but spaced from the first member 20 as shown in FIGURE 1. A pair of spacers 22 are situated between the members 20 and 21 and are secured thereto and these spacers, together with the portions 23 and 24 of the members, define a socket 25.

Two pairs of plates 26 are secured to and extend forwardly of the brackets 13 and form crevices which single plates 27 engage within, these plates being secured within the crevices by means of pivot pins 28. The plates 27 are secured to a cross member 28 of an A-frame collectively designated 29 forming the part of a tow bar assembly.

The diverging ends 30 of the A-frame are secured to the aforementioned cross member 28 as by welding or the like. These diverging members 30 extend forwardly to apex area collectively designated 31 and a pair of plates 32 span the upper and lower sides of members 30 and are welded thereto.

A connecting member collectively designated 33 forms the upper portion of the tow bar collectively designated 29 and consists of a longitudinal member 34 having a clevis hitch 35 on the forward end thereof by which it may be attached to a vehicle adapted to tow the other vehicle to which the towing means is secured.

A substantially triangular portion 36 is formed on the inner end 37 of the connecting member 34 and takes the form of a pair of side diagonal braces 38 secured to the longitudinal member 34 and extending rearwardly, a cross member 39 being welded to the ends 40 of the diagonal brace 38 and to the end of the member 34.

This triangular portion 36 is shaped so that it nests within the apex area 31 of the A-frame when in the forward or extending position as shown in FIGURE 1. An aperture or drilling 41 is formed through the member 34 adjacent the inner end 37 thereof and corresponding apertures 42 are formed between the plates 32 covering the apex area 31. These apertures are aligned when the connecting member 33 is in the forward position shown in FIGURE 1 and a clevis pin 43 passes through these apertures thus locking the connecting member 33 to the A-frame 29.

It will be noted that as the connecting member is moved towards the apex area 31, side play is permitted thus facilitating the hooking up of the vehicle to which it is to be attached.

However, when it is desired to store the tow bar on the vehicle, it is adapted to be situated in the vertical position as shown in FIGURE 3, the A-frame pivoting on the pivot pins 28.

In this position, the connecting member 33 is retracted or slipped downwardly within the A-frame as clearly shown and means are provided to lock both the A-frame and the connecting member in the vertical position against inadvertent displacement therefrom.

In this embodiment I have provided a substantially rectangular plate 44 secured to and extending rearwardly from the cross bar 39 of the connecting member 33. When the A-frame and the connecting member 33 are moved to the vertical position, the connecting member can be moved downwardly within the A-frame so that the aforementioned plate 44 engages the aforementioned socket 25 within the mounting structure. The clevis pin 43 may then engage through the apertures 42 within the plates 32 and through an aperture 45 formed within the front clevis 45 of the connecting member 33.

This locks the assembly securely in the vertical position shown in FIGURE 3 yet it is easily moved to the towing position by moving the clevis pin 43, pivoting the A-frame downwardly and extending the connecting member 33 to the position shown in FIGURE 1.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A towing bar for trucks and the like adapted to be selectively located in a towing position on a substantially vertical storage position, comprising in combination, mounting means for mounting said towing bar to said truck, an A-frame pivotally secured by the diverted ends thereof to said mounting means, a towing arm slidable through the apex of said A-frame, clevis means co-operating between said towing arm and said apex to selectively lock said towing arm in a towing position and in a storing position, and means co-operating between said towing arm and said mounting means for selectively locking said towing arm and said A-frame in the said substantially vertical storage position, when said towing arm is in said storing position, said means co-operating between said towing arm and said mounting means for selectively locking said towing arm comprises an engaging member secured to and extending from said inner end of said connecting member and socket means formed in said mounting means, said engaging member entering said socket when said towing arm is in the storing position within said A-frame and when said towing arm and said A-frame are in the substantially vertical position.

2. The device according to claim 1 in which said towing arm includes a substantially elongated connecting member and a substantially triangular shaped portion formed on the end of said connecting member, said triangular shaped portion nesting within said apex of said A-frame and said towing is in the towing position, said clevis means passing through aligned apertures in said apex and said connecting member.

3. The device according to claim 2 in which said clevis means passes through an aperture in the rear end of said connecting member and said aperture in said apex when said towing arm is in the stored position.

4. The device according to claim 1 in which said mounting means includes a pair of brackets, a member extending between said brackets, a further member extending between said brackets in spaced and parallel relationship with said first member, and a pair of spacers secured between said members, said spacers and said members defining said socket means.

5. The device according to claim 2 in which said mounting means includes a pair of brackets, a member extending between said brackets, a further member extending between said brackets in spaced and parallel relationship with said first member, and a pair of spacers secured between said members, said spacers and said members defining said socket means.

6. The device according to claim 3 in which said mounting means includes a pair of brackets, a member extending between said brackets, a further member extending between said brackets in spaced and parallel relationship with said first member, and a pair of spacers secured between said members, said spacers and said members defining said socket means.

References Cited

UNITED STATES PATENTS

| 2,378,504 | 6/1945 | Roos | 280—491 |
| 2,880,016 | 3/1959 | Peterson | 280—491 |
| 2,918,310 | 12/1959 | Carson | 280—478 |
| 2,988,383 | 6/1961 | Carson | 280—478 |
| 3,281,162 | 10/1966 | Carson | 280—478 |
| 3,287,027 | 11/1966 | Schuckman | 280—491 |

LEO FRIAGLIA, *Primary Examiner.*